W. F. STEARNS.
RUBBER JACKETED WHEEL RIM.
APPLICATION FILED NOV. 7, 1912.
1,163,701. Patented Dec. 14, 1915.
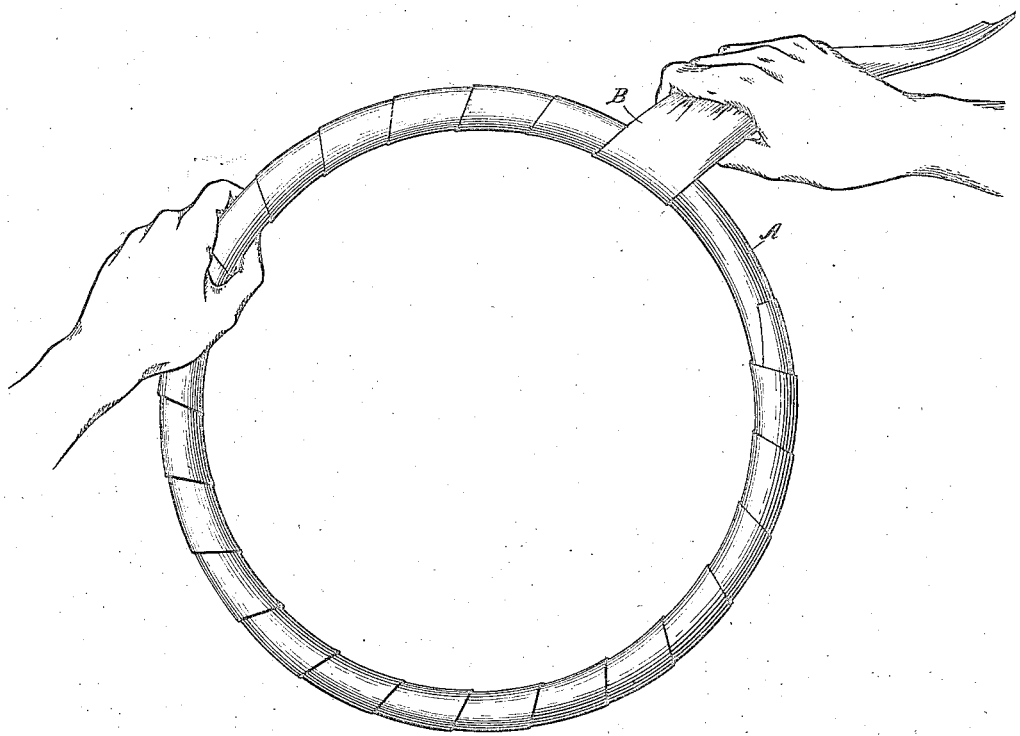
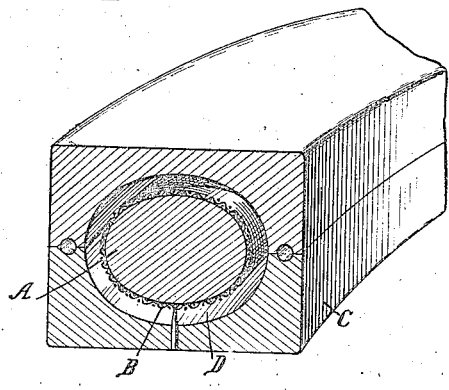
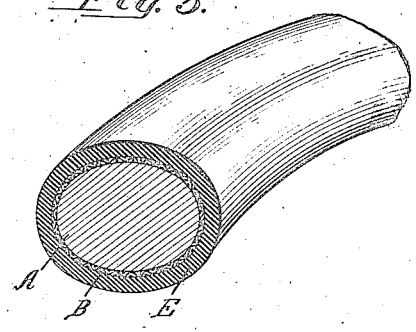
Witnesses:
Inventor:
William F. Stearns.

UNITED STATES PATENT OFFICE.

WILLIAM F. STEARNS, OF EVANSTON, ILLINOIS.

RUBBER-JACKETED WHEEL-RIM.

1,163,701.  Specification of Letters Patent.  Patented Dec. 14, 1915.

Application filed November 7, 1912. Serial No. 729,960.

*To all whom it may concern:*

Be it known that I, WILLIAM F. STEARNS, citizen of the United States, residing at Evanston, in the county of Cook and State of Illinois, have invented certain new and useful Improvements in Rubber-Jacketed Wheel-Rims; and I do hereby declare the following to be a full, clear, and exact description of the invention, such as will enable others skilled in the art to which it appertains to make and use the same.

This invention has for its object to provide a rubber covered wheel rim particularly adapted for the wheels for operating the steering gear of motor-propelled vehicles and the like.

The invention consists in the features of construction and combinations of parts hereinafter fully described and particularly claimed.

In the accompanying drawings illustrating the invention: Figure —1— is a view in elevation of a wheel rim partly covered with so-called frictioned fabric. Fig. —2— is a fragmentary sectional view showing the frictioned-fabric covered wheel rim disposed in a mold preparatory to adding the final coating of rubber and vulcanizing the same. Fig. —3— is a fragmentary detail sectional view of the finished wheel rim.

Wheel rims of the steering gear operating wheels of automobiles and the like are frequently covered by their owners with material such as electric tape, cord and the like, whereby the slippage of the hands on the wheel in manipulating the same is obviated or minimized. These means of providing a non-slipping surface are more or less unsatisfactory, detract greatly from the neat appearance of the wheel and tend to soil the hands and gloves of the operator of the same.

The object of my invention is to provide a wheel rim having a vulcanized rubber covering which is so applied as to be absolutely rigid with the wheel rim, which will present a highly frictional surface and at the same time not detract from the neat appearance of the wheel. To this end the wheel rim A, which may be of wood or any other material suited to the purpose and which may be of any usual shape in cross-section, is first coated with so-called frictioned fabric, usually consisting of cotton duck impregnated with a vulcanizable rubber compound by means of machinery which puts the warp threads of the fabric under great tension during the process so that the latter is fully stretched at the time that the impregnation with the rubber compound has been effected. The friction fabric is preferably applied to the wheel rim A by winding a ribbon B of the same helically about said wheel rim until the latter has been fully covered, a constant and comparatively high tension being maintained on the ribbon during the winding thereof upon said wheel rim. The ribbon B of the frictioned fabric may be of any desirable width and each winding thereof preferably made to partially overlap the preceding winding thereof in a well-known manner, but this is not essential. It is mainly desirable that the fabric shall be wound upon the wheel rim as tightly as possible so as to obviate slippage, creeping, crowding or other relative movement between the rim and its jacket. After the said ribbon B of frictioned fabric has been wound upon the rim A to completely cover the same the said covered rim is placed in a vulcanizing mold C of any suitable construction and which is diagrammatically illustrated in Fig. —2—. The annular space D between the mold cavity and the frictioned surface coating of the rim A is filled with vulcanizable rubber compound in the usual manner and said mold then placed in the vulcanizer whereupon the compound impregnating the ribbon B and the rubber compound filling the annular space D are vulcanized to the required degree of hardness whereupon the said wheel rim A with its rubber coat may be removed. The vulcanized rubber coating E of the rim A is continuous and homogeneous over the entire surface of the rim A and through the pores of the fabric, as, during vulcanization the rubber compound impregnating the fabric becomes homogeneous with the outer layer. The said rim A is adapted to be mounted upon the steering post by means of spokes in a well-known manner.

The rubber covering E and fabric covering B of the rim may be cut away at the points at which attachment of said rim A to the spokes of the wheel is intended to be effected or, preferably, the said fabric and rubber covering are omitted at the places where such attachment is to be effected. This may be easily accomplished in any manner well-known to persons skilled in the art and illustration and particular description thereof are, therefore, omitted.

In order that the possibility of relative movement such as creeping or crowding of the jacket on the rim may be more certainly prevented and obviated I prefer to employ for the impregnation of the ribbon B a vulcanizable rubber compound of such a character as will, in the process of vulcanization, become harder than the outer coating or jacket E so that the inner lining of the jacket will during the process of vulcanization form a relatively stiff tube which will resist compression longitudinally to a greater extent than if said inner lining were more flexible and soft. It is preferable that the outer coating E should be relatively soft as thereby a better hold or engagement of the hands on the rim will be assured than if said outer coating presents a hard and unyielding surface.

I claim as my invention:

1. In a rim for an annular core, the combination of a layer of fabric wound on and frictionally engaging said core, and a vulcanized rubber jacket completely covering said fabric: said rubber jacket comprising an inner and relatively hard portion penetrating said fabric, and an outer and relatively soft portion integral with said inner portion.

2. A tubular wheel rim comprising an inner layer of fabric: an outer layer of vulcanized, flexible and compressible rubber: and an intermediate layer of relatively hard and incompressible vulcanized rubber, said intermediate layer being integral with said outer layer and penetrating the interstices of the said fabric.

In testimony whereof I have signed my name in presence of two subscribing witnesses.

WILLIAM F. STEARNS.

Witnesses:
  M. M. BOYLE,
  RUDOLPH WM. LOTZ.